United States Patent

[11] 3,623,097

[72] Inventor Raymond H. Femenias
 Washington, D.C.
[21] Appl. No. 842,479
[22] Filed July 17, 1969
[45] Patented Nov. 23, 1971
[73] Assignee The United States of America as
 represented by the Secretary of the Army

[54] MODULATION CORRELATED FM RANGING SYSTEM
 11 Claims, 2 Drawing Figs.

[52] U.S. Cl. ................................................. 343/14
[51] Int. Cl. ................................................ G01s 9/24
[50] Field of Search ....................................... 343/14

[56] References Cited
 UNITED STATES PATENTS
 2,834,956 5/1958 Harris ............................ 343/14
 3,166,747 1/1965 Adrian .......................... 343/14

Primary Examiner—T. H. Tubbesing
Attorneys—Harry M. Saragovitz, Edward J. Kelly, Herbert Berl and J. D. Edgerton ABSTRACT: A modulation correlated FM ranging system for the detection and reliable indication of target presence and distance to target. The system utilizes cross-correlation and successive coherent detection techniques to provide a greatly improved signal-to-noise ratio at the receiver output in addition to the featured capability of coding against foreign signals. The system is insensitive to leakage effects and can range quantizing-effect free and ambiguity free while sacrificing neither transmitter bandwidth nor in-target observation time. The system also provides an optimal figure of merit for distance-measuring systems. In addition to distance measurement by frequency difference, the system incorporates a special time delay parameter which, when properly selected, allows a high correlation at the receiver output whenever a target is present in the target area.

PATENTED NOV 23 1971

3,623,097

INVENTOR,
RAYMOND H. FEMENIAS

BY Harry M. Saragovitz
Edward J. Kelly
Herbert Berl
J. D. Edgerton
ATTORNEYS 3,623,097

MODULATION CORRELATED FM RANGING SYSTEM

RIGHTS OF GOVERNMENT

The invention described herein may be manufactured, used, and licensed by or for the United States Government for governmental purposes without the payment to me of any royalty thereon.

BACKGROUND OF THE INVENTION

This invention relates generally to distance measuring systems and more particularly to the frequency modulated (FM) class of such systems which measure distance to a target by observing the frequency difference, or the phase shift, between a continuous, frequency-varying transmitted signal and its reflected portion from the target. More particularly, the device of the present invention incorporates into its system the novel signal detection technique of cross-correlating the modulation content of the received signal imbedded in noise with a delayed version of the arbitrary modulation waveform.

MOdern communications theories establish that the cross-correlation receiver, being equivalent to the matched receiver, offers the best possible signal-to-noise (S/N) ratio improvement. This is of interest to distance measuring systems because their performance depends directly on a figure of merit given by the product of the transmitted bandwidth and the signal-energy to noise-energy ratio. Past efforts to combine the well-known advantages of FM distance measuring systems with modulation-related cross-correlation were restricted to the correlation between only one of the sidebands of the signal's frequency spectrum and some harmonic of the modulating frequency. This results in the loss of 4 to 10 db. of signal power and a severe reduction of the transmitted bandwidth. Such processes also require complicated circuitry and narrow band filtering, and therefore, a fixed single-tone sinusoidal modulating frequency, which has known shortcomings in FM modulation systems. For example, a fixed modulation frequency does not allow the use of random noise waveforms in the modulation voltage, a feature which is necessary to prevent ambiguity in the output voltage to distance relation.

Accordingly, an object of the present invention is the provision of a frequency-modulated distance-measuring system using cross-correlating techniques which overcome the disadvantages of prior known systems.

A further object of this invention is to improve the performance of an FM distance measuring system by greatly increasing the signal-energy to noise-energy ratio at the output of the receiver with respect to the S/N ratio at the receiver input.

Another object of this invention is to provide an FM ranging system that is insensitive to transmitter-to-receiver leakage effects, while sacrificing neither transmitter bandwidth nor in-target observation time.

An additional object of this invention is to provide an FM ranging system that utilizes a large class of periodic or random modulating waveforms, thus providing distance information that is free from ambiguities, free from the quantizing effect, and which is easily coded against foreign signals.

A still further object of this invention is to provide an FM ranging system that has an optimal figure of merit for its operation.

Suitable combinations of the above features enable the device of the present invention to extract those signals imbedded more deeply in noise than past FM ranging systems. This, in turn, results in the ability of the present invention to perform at longer distances, to counterbalance the effect of heavier noise interference, and to obtain, with less transmitted power, results equivalent to past FM ranging systems. Thus it will be possible to replace expensive and power-consuming vacuum tube, klystron or magnetron transmitters with lower power semiconductor devices. Another important feature is that the present invention's insensitivity to transmitter-to-receiver leakage will allow larger transmitted power at improved signal-to-noise ratios.

SUMMARY OF THE INVENTION

Briefly, in accordance with this invention, a modulation correlated FM ranging system is provided to afford accurate and reliable distance measurement. The new system features great signal-to-noise ratio improvements in the received echo signal through the use of two successive coherent detectors. A high degree of reliability is achieved by frequency comparing the received echo signal with the transmitted signal and by cross-correlating the extracted modulation content of the received echo signal with the delayed modulation reference voltage. The cross-correlation techniques utilized allow for the use of a random frequency modulation waveform which increases anti jamming capabilities through the coding of the modulation waveform.

BRIEF DESCRIPTION OF THE DRAWINGS

The specific nature of the invention as well as other objects, aspects, uses, and advantages thereof will clearly appear from the following description and from the accompanying drawings, in which.

DESCRIPTION OF THE PREFERRED EMBODIMENT

Figure 1:
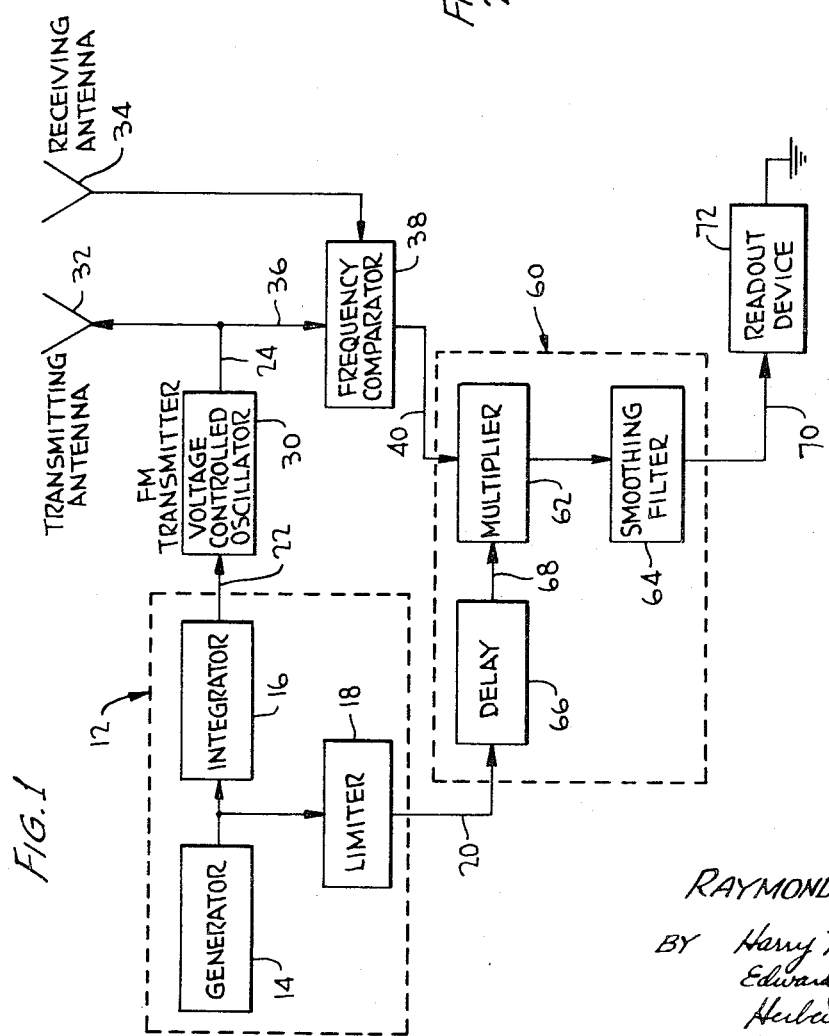
FIG. 1 is a block diagram of a modulation correlated FM ranging system embodying the present invention.

In FIG. 1, a modulator, indicated within the dotted lines at 12, includes a generator 14 which supplies a suitable waveform to an integrator 16 and to a limiter 18. The generator 14 waveform can be of any random or periodic nature that provides a probability of carrier frequency upswings of the same order of magnitude as the probability of frequency downswings, as explained more fully below. Among the large class of such waveforms are the Gaussian random modulation, the sinusoidal modulation, and the triangular wave modulation. The modulator 12 delivers at line 20 from limiter 18 an amplitude-limited (clipped) sample of the generator voltage waveform, referred to as the modulation reference.

The integrator 16 integrates the generator waveform and feeds it to a linear voltage-controlled oscillator (VCO) 30. This form of FM transmitter changes its frequency output proportionally to the voltage waveform input. Thus the output frequency waveform of VCO 30 increases when the input modulation voltage at line 22 increases and decreases when the modulation voltage decreases. This frequency-modulated signal at line 24 is transmitted by way of transmitting antenna 32 and the FM signal reflected off the target is received by receiving antenna 34. The received signal is then fed to a frequency comparator 38 which also accepts a sample of the transmitted signal by way of line 36.

The frequency comparator 38 is a double input device that delivers no output voltage when both input signals have equal frequency and delivers a constant amplitude output voltage that has a positive polarity if one predetermined source has a frequency higher than the other source, and a negative polarity in the opposite case. One example of such a device is described in Molton et al. U.S. Pat. No. 2,933,682, "Frequency Measuring Apparatus." Since the received signal at 34 is a time delayed version of the transmitted signal at 32, the latter will have a higher frequency than the former during carrier frequency upswings and therefore the corresponding frequency comparator 38 output voltage at 40 will be positive. During carrier frequency downswings, the received signal will be higher in frequency than the transmitted signal and thus the output voltage at 40 will be negative. Since the output voltage polarity at 40 changes when the transmitted and received signal frequencies are equal, it is seen that these changes occur after each upswing-downswing frequency transition with a time lag that is one-half of the transmit-receive time delay.

Figure 2:
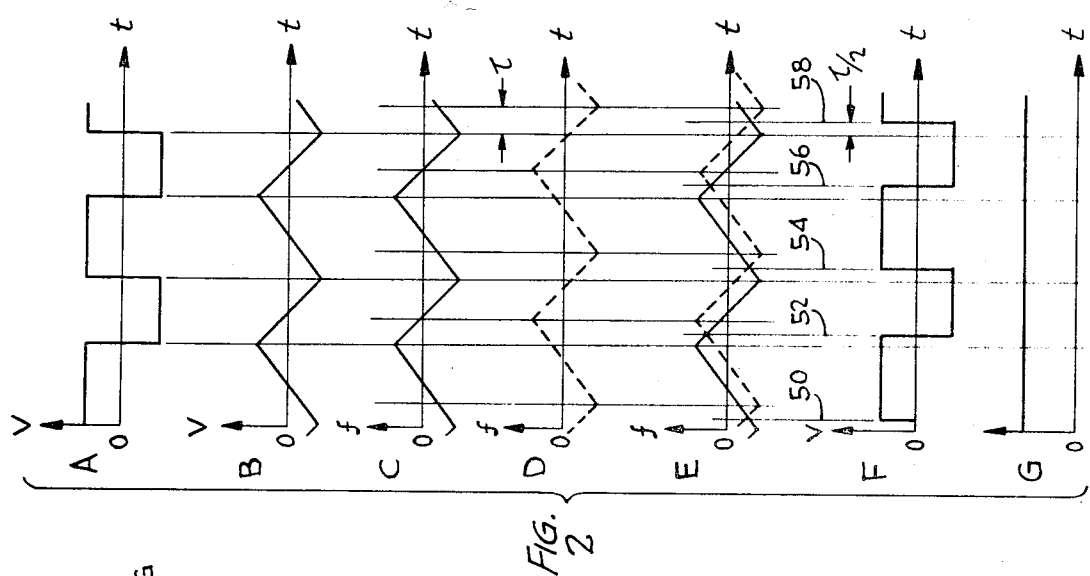
FIG. 2 illustrates the processing of a sample waveform in the system of FIG. 1.

The preceding can be more clearly understood with the aid of FIG. 2, which shows the processing of a sample waveform at equal points in time through the system of FIG. 1. The modulation waveform chosen for illustrative purposes is a triangular wave with random instantaneous frequency. FIG. 2 shows a square wave which is generated by the generator 14 of FIG. 1 and is subsequently integrated by integrator 16 to produce the triangular modulation waveform shown at B in FIG. 2.

The limiter 18 of FIG. 1 does not alter the square waveform from generator 14 since a square wave is inherently amplitude limited. The limiter 18 would act to clip many of the other possible generator waveforms so as to produce at line 20 a square wave output, the modulation reference. Therefore, waveform A of FIG. 2 also represents the aforesaid modulation reference waveform present at line 20 of FIG. 1.

Waveform B of FIG. 2 will modulate the carrier of VCO 30 of FIG. 1 to create an output signal whose frequency will be proportional to the input voltage. This output, which is the FM transmitted signal, will therefore also be triangular on the frequency axis as shown at C of FIG. 2. The received signal, shown at D in FIG. 2, will be delayed a time $t$ defined as the two-way travel time of the signal from transmitter to receiver.

The manner in which frequency comparator 38 of FIG. 1 acts on the transmitted and received signals can be better seen at E and F of FIG. 2. E shows waveforms C and D superimposed in time where the transmitted signal is represented by the solid line waveform while the received signal is shown as a broken line waveform. Waveform F of FIG. 2 shows the output voltage waveform of the frequency comparator 38 in response to the waveforms shown at E. It is easily seen that the waveform F has a positive polarity when the frequency of the transmitted signal is greater than that of the received signal, as occurs for example between lines 50 and 52, and a negative polarity in the opposite case, as occurs for example between lines 52 and 54, and that the output polarity changes at F occur when both input signals have equal frequency, those points in time represented by lines 50, 52, 54, 56, and 58. Thus the frequency comparator output voltage waveform F is, in the presence of a target signal return, an exact replica of the modulation reference waveform A except for a time delay $t/2$ which is the one-way travel time of the signal from the transmitter to target, or from the target to the receiver.

The foregoing has been somewhat of an idealization, since in practice there will invariably be some type of noise signal superimposed on the received signal. However, judicious selection of the output filter (not shown) bandwidth $B_2$ of the frequency comparator 38 has been shown to result in an improvement in the S/N ratio at the output of the frequency comparator, $(S/N)_{out}$, when compared with the S/N ratio of the received signal at its input, $(S/N)_{in}$. This improvement in S/N ratio is a result of an inherent property of the frequency comparator known as coherent detection, as investigated by R.A. Smith, "The Relative Advantages of Coherent and Incoherent Detectors: A Study of Their Output Noise Spectra Under Various Conditions," Telecommunications Research Establishment, Institute Monograph, Aug. 15, 1951. This improvement can be expressed mathematically as:

$$(S/N)_{out}=(S/N)_{in}\times(B_1/B_2)^{1/2} \qquad (1)$$

where $B_1$ is the bandwidth of the received signal which contains uniformly distributed noise represented by signal-to-noise ratio $(S/N)_{in}$.

Thus, alien signals, being random or periodic, will be greatly reduced by an amount given by formula (1) and, in any case, will produce a frequency comparator 38 output voltage waveform different than the modulation reference waveform.

Referring again to FIG. 1, the frequency comparator 38 output voltage at line 40 is next fed into a cross-correlator, indicated within the dotted lines at 60, which is composed of a multiplier 62, a smoothing filter 64 and a delay circuit 66. The other input to the cross-correlator 60 is the clipped sample of the generator waveform from line 20, that is, the modulation reference. This signal is fed into the delay circuit 66, where the time delay $t_o$ is made equal to the one-way travel time of the transmitted signal $t/2$ for the predetermined target area of interest. By varying the time delay of circuit 66, a wide range of distances may be scanned. Thus, referring back to our sample case in FIG. 2, waveform F now represents the waveform present at line 68 of FIG. 1, as well as the waveform present at line 40. The delayed modulation reference voltage at line 68 and the frequency comparator output voltage at line 40 are fed into a voltage multiplier circuit 62 and then to smoothing filter 64 which acts as an integrator for the product of the input voltages.

It should be noted that the multiplier 62 is fed with a noise-free reference at input 68 and with an identical waveform inbedded in noise at input 40. Therefore there exists once again a case of coherent detection and formula (1) can be reapplied to the S/N ratio improvement within the cross-correlator 60. Mathematically: $(S/N)_{out}=(S/N)_{in}\times(W_1/W_2)^{1/2} \qquad (2)$
where $(S/N)_{out}$ represents the signal-to-noise ratio at correlator 60 output, $(S/N)_{in}$ represents the signal-to-noise ratio of the signal at input line 40, $W_1$ represents the bandwidth of the input noise at 40, and $W_2=K/T$ where T is the integration time of the filter 64 and is restricted only by the allotted observation time and K is a design constant.

The cross-correlation features of the system of the present invention are now apparent: A noise-free signal, the modulation reference, is used to investigate the existence of a similar signal, that at the frequency comparator output, imbedded in some complex combination of interfering random and/or periodic signals. The detection process is obtained by integrating the product of the delayed modulation reference voltage and the frequency comparator output. In the case of a target return signal in the observed range, the output of the cross-correlator at 70 in FIG. 1 will correspond to a high correlation between the two input signals and will be indicated on a suitable readout device 72 as a DC output voltage as shown by waveform G in FIG. 2. In the case of the presence of foreign signals such as jamming, no such correlation will exist because the modulation content of the received signal must be matched by the delayed modulation reference in order for a high correlation to be indicated. The invaluable property of being able to code the modulation waveform in a random manner now becomes evident. Of all the detection processes cross-correlation is the only one that recognizes both instantaneous frequency and phase of the received signal. Therefore coding can be obtained by varying the instantaneous frequency of the modulation waveform in any desired manner.

Also, by giving random properties to the modulation frequency, Horton in Proc. IRE, May 1959 "Noise-Modulated Distance Measuring Systems" has proven that distance measurement by correlation can be made free of both ambiguity and quantizing effect.

The time delay, typical of any correlation operation, is provided by the echo signal travel time and is therefore an indication of the target distance. The S/N ratio present at line 70 of FIG. 1 will have been greatly improved with respect to the already improved S/N ratio present at the correlator input 40, that is the frequency comparator 38 output, as evidenced by formulas (1) and (2). The cross-correlation process of the present invention is equivalent to the well-known matched filter action, hence optimal signal-to-noise power ratio improvement is achieved. The process demands no sacrifice in observation time, thus the signal-energy to noise-energy ratio improvement is also optimal, considering that energy power emitted during the observation time. This FM system also utilizes all significant sidebands of the transmitted signal, hence there is no loss of transmitted bandwidth. It follows that the product of the bandwidth and signal-energy to noise-energy ratio, a figure of merit for distance measuring systems given by P. M. Woodward in his book, "Probability and Information Theory, with Applications to Radar," McGraw-Hill 1953, is also optimal. In addition to distance information obtained by difference frequency, as in all FM systems, such ranging information is strengthened by selecting the time delay $t_o$ of the delay circuit 66 in FIG. 1 so that it equals the one-way echo signal travel time at the desired distance.

It is additionally evident at this point that in a direct path between transmitter and receiver where leakage might occur, the frequency comparator of the present invention would accept two signals of identical frequency and would deliver, by definition, no output voltage, thus minimizing such leakage effects. Special output voltage vs. distance relations could be obtained with certain modulation waveforms. Also, the modulator 12 may have low pass networks other than an integrator 16. The principles and circuits suggested by Horton in the aforementioned reference could be applied to the modulator design. Additionally, either analog or digital embodiments could be used or combinations thereof. It is obvious that an array of such systems of the present invention could be used to scan a large number of ranges.

I wish it to be understood that I do not desire to be limited to the exact details of construction shown and described, for obvious modifications will occur to a person skilled in the art.

I claim as my invention:

1. A frequency-modulated system for use as a distance measuring device comprising, in combination:
   a. signal-generating means for producing a voltage waveform for use as a modulating signal and as a reference signal,
   b. transmitting means responsive to said modulating signal for producing a frequency-modulated signal and propagating said frequency-modulated signal toward a target area,
   c. receiving means for receiving said frequency-modulated signal from said target area,
   d. frequency-comparing means for comparing the frequencies of said received signal and said transmitted signal and for producing a first output signal whose polarity is based on said comparison,
   e. correlating means for correlating said first output signal with said reference signal and producing a second output signal whenever a target is in the said target area.

2. The invention according to claim 1 wherein said signal-generating means comprises a generator for producing said voltage waveform, an integrator which integrates said voltage waveform to produce said modulating signal, and a limiter which acts on said voltage waveform to produce said reference signal.

3. The invention according to claim 1 wherein said transmitting means comprises a voltage-controlled oscillator which produces a carrier frequency output that is proportional to the voltage of said modulating signal.

4. The invention according to claim 1 wherein said correlating means comprises a delay circuit which imposes a selected time delay upon said reference signal, a multiplier circuit which produces the product of the said time-delayed reference signal with the said first output signal, and a smoothing filter which acts on said product to filter out noise signals and provide said second output according to the correlation between the two input signals.

5. The invention according to claim 1 wherein said voltage waveform comprises a waveform having a random instantaneous frequency.

6. A method of detection and indication of a target in a predetermined target area comprising the steps of:
   a. generating a signal to be used as a modulating signal and as a reference signal,
   b. transmitting a frequency-modulated carrier signal in response to said modulating signal towards said predetermined target area,
   c. receiving said frequency-modulated carrier signal in the presence of said target in said predetermined target area,
   d. comparing the frequency of said received FM signal with the frequency of the transmitted FM signal to obtain a first output signal,
   e. time delaying said reference signal,
   f. correlating said time-delayed reference signal with said first output signal to obtain a second output signal.

7. The invention according to claim 6 wherein said modulating signal provides a probability of carrier frequency upswings of the same order of magnitude as the probability of frequency downswings.

8. The invention according to claim 6 wherein said first output signal is of a positive polarity when the frequency of the transmitted signal is higher than the frequency of the received signal and is of a negative polarity when the transmitted signal is of lower frequency than that of the received signal.

9. The invention according to claim 6 wherein said first output signal is a replica of said time-delayed reference signal wherever said target is present in the said target area.

10. The invention according to claim 6 wherein the time delay applied to said reference signal is equal to the one-way travel time of the transmitted signal to said target.

11. The invention according to claim 6 wherein said second output is a DC voltage whenever the said first output signal and the delayed reference signal correlate.

* * * * *